United States Patent [19]

Karr

[11] Patent Number: 5,661,470

[45] Date of Patent: Aug. 26, 1997

[54] OBJECT RECOGNITION SYSTEM

[76] Inventor: Gerald S. Karr, 10410 Palms Blvd., Los Angeles, Calif. 90034

[21] Appl. No.: 205,384

[22] Filed: Mar. 4, 1994

[51] Int. Cl.$^6$ .......................... G08C 19/00; G08B 13/14
[52] U.S. Cl. ................ 340/825.54; 340/572; 340/825.3; 340/825.57; 340/825.72
[58] Field of Search ................... 340/825.54, 825.71, 340/825.72, 572, 825.3, 825.31, 825.57

[56]  References Cited

U.S. PATENT DOCUMENTS

| | | | |
|---|---|---|---|
| 3,863,244 | 1/1975 | Lichtblau | 340/280 |
| 3,868,669 | 2/1975 | Minasy | 340/258 |
| 3,919,704 | 11/1975 | Williams et al. | 340/280 |
| 4,002,263 | 1/1977 | Marcellini | 220/378 |
| 4,281,321 | 7/1981 | Narlow et al. | 340/572 |
| 4,369,557 | 1/1983 | Van De Bult | 29/25.42 |
| 4,631,708 | 12/1986 | Wood et al. | 340/825.54 |
| 4,654,658 | 3/1987 | Walton | 340/825.54 |
| 4,752,776 | 6/1988 | Katzenstein | 340/825.54 |
| 4,818,855 | 4/1989 | Mongeon et al. | 340/825.54 |
| 4,862,160 | 8/1989 | Ekchian et al. | 340/825.54 |
| 4,972,198 | 11/1990 | Feltz et al. | 340/572 |
| 4,991,350 | 2/1991 | Kirk | 49/169 |
| 5,028,918 | 7/1991 | Giles et al. | 340/825.54 |
| 5,083,113 | 1/1992 | Slawinski et al. | 340/572 |
| 5,105,190 | 4/1992 | Kip et al. | 340/572 |
| 5,126,749 | 6/1992 | Kaltner | 340/572 |
| 5,231,273 | 7/1993 | Caswell et al. | 340/825.54 |
| 5,241,298 | 8/1993 | Lian et al. | 340/572 |

OTHER PUBLICATIONS

Electrical Engineering Handbook (3rd Edition), McGraw Hill, p. 17.
Algorithms, by Robert Sedgevich, Addison Wesley Publishing Co., 1988 pp. 320 and 293.
Digital Signal Processing, IEEE Publication, 1982, edited by N.B. Jones Primary Examiner—Michael Horabik
Assistant Examiner—Edward Merz
Attorney, Agent, or Firm—Richard A. Joel, Esq.

[57] ABSTRACT

This invention relates to resonant LC responders that are placed inside objects such as toys. The device includes an interrogation or base unit which sends a pulse and passive responders which reply with their unique frequency which is sensed by the base unit. The base unit senses the frequency and triggers a response in the play pattern of the object such as speaking or turning on a motor. The invention can discriminate multiple responders based on their frequency or location. Further, the device can interface with active responders as well. The invention provides a low cost, simple device to provide recognition particularly at a distance in interactive toys.

27 Claims, 6 Drawing Sheets

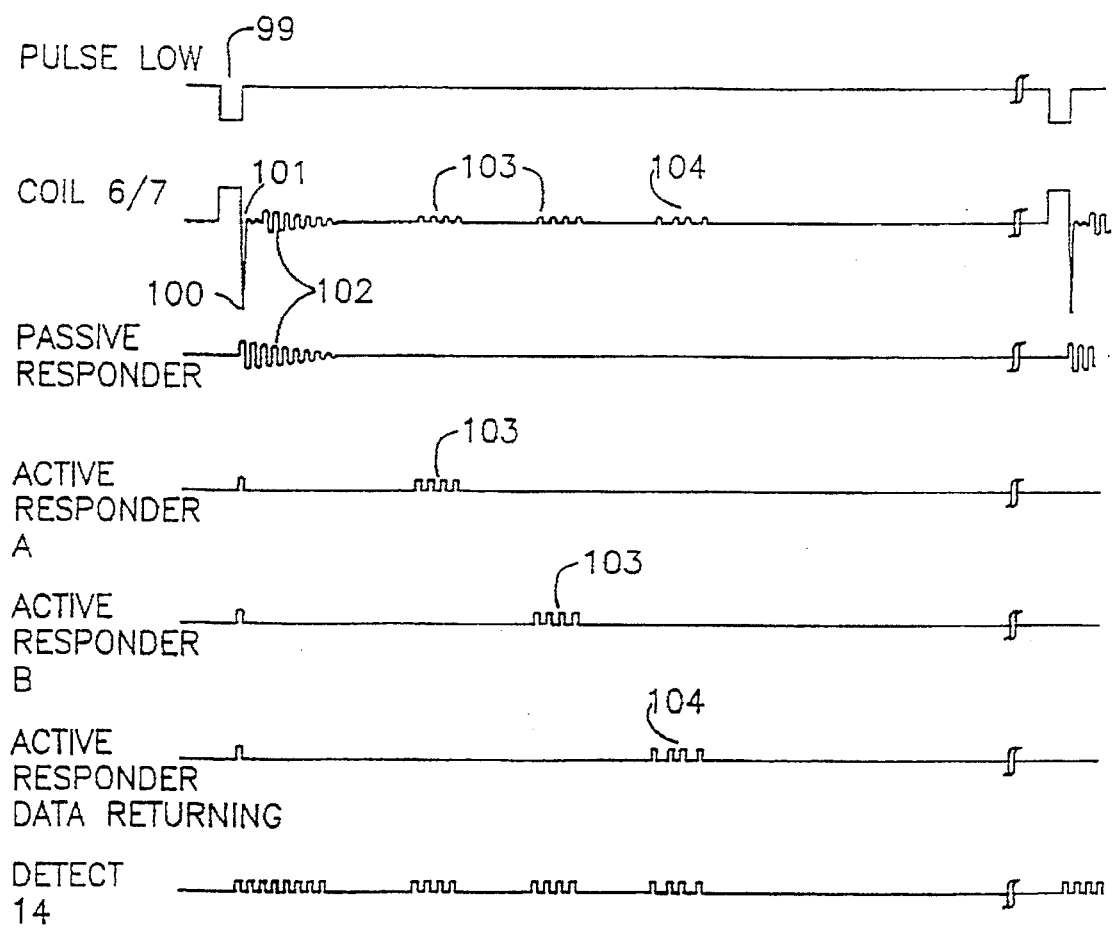

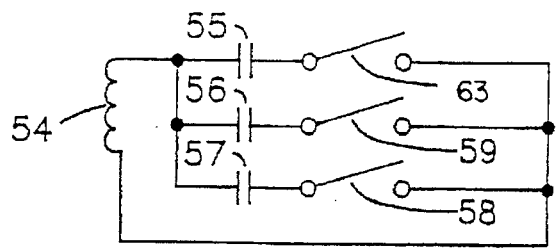
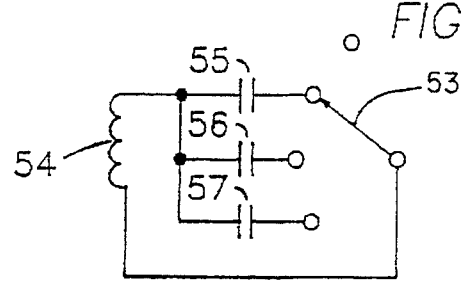
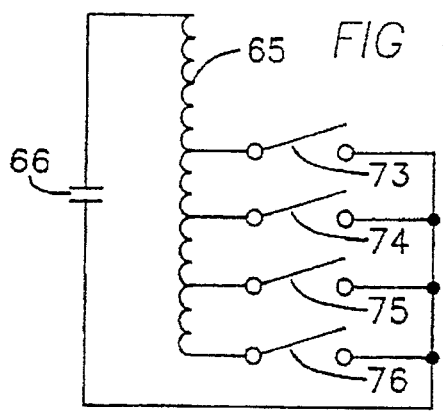
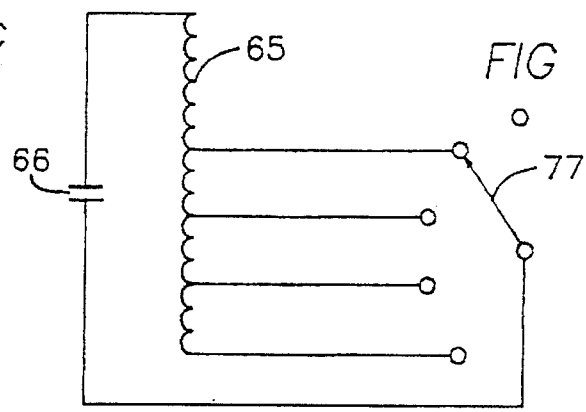
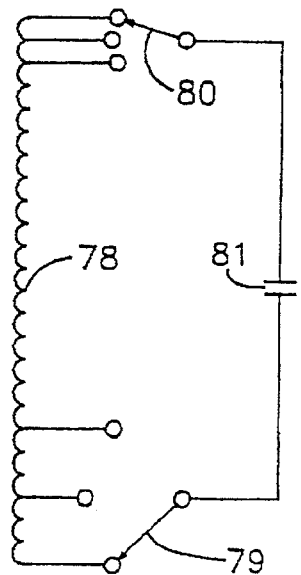
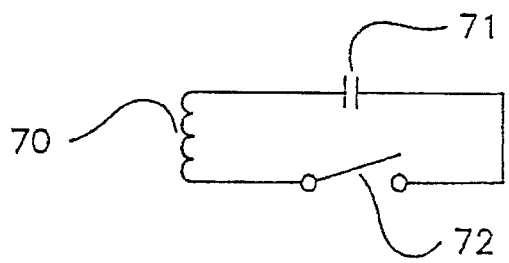

५,६६१,४७०

OBJECT RECOGNITION SYSTEM

BACKGROUND OF THE INVENTION

This invention relates to LC responders and particularly to LC responders that are placed within objects such as toys. In operation, an interrogation or base unit sends a pulse and passive responders reply with their unique frequency which is sensed by the base unit triggering a particular response such as turning on a motor etc.

The prior art includes a technology used for anti-theft retail security tags. Specific prior art patents range more broadly and include U.S. Pat. Nos. 4,002,263 and 4,991,350 which relate to magnetically actuated pet doors. While both patents relate to bi-directional pet doors which appear to use retaining magnets, neither discloses the use of a frequency selective key.

The prior art also includes U.S. Pat. Nos. 3,863,244, 3,868,669, 3,919,704, 4,281,321 and 4,369,557 which are merely examples of alarm devices using passive responders or the like.

The toy business requires extremely inexpensive circuits which are simple and reliable. Some of the problems solved by this invention involve the recognition of frequencies at a distance, the orientation of the transmitter receiver to the responder and the receiving of simultaneous signals from more than one responder. The prior art devices are generally designed to accept or reject a specific frequency.

SUMMARY OF THE INVENTION

This invention relates to LC (inductor-capacitor) resonant circuit passive responders that are mounted within objects such as toys. The invention includes a base or interrogation unit which sends a pulse and passive responders which reply with their particular frequency. The base unit determines what frequency, if any, is incoming and triggers a response in the play pattern such as speaking or turning on a motor etc.

Using LC tank circuits as non-powered excitable radiators and non-resonant active responders, the invention can discriminate among multiple responders based on their frequencies. Thus it is possible to cause particular responses in toys with the present invention. For example, a plush bear could be sensed by the control unit and it could also be controlled to move its eyes by the same pulses that are used to sense its presence.

Accordingly, an object of this invention is to provide a simple and inexpensive device to control an object such as a toy.

Another object of this invention is to provide a means to discriminate multiple responders based on their frequencies.

A further object of this invention is to provide means to interface with and control active responders as well as non-responding devices.

A more specific object of this invention is to provide means to create an interactive situation wherein the user can control the behavior of an interactive system or system of encoded objects, combined with speech or other responses to produce multiple responses.

BRIEF DESCRIPTION OF THE DRAWINGS

Other objects and advantages of the present invention may be more clearly seen when viewed in conjunction with the accompanying drawings wherein:

FIG. 2 illustrates timing diagrams detailing the operation of the invention;

FIG. 6a–6f disclose schematic representations of switchable responders.

DETAILED DESCRIPTION OF THE INVENTION

Figure 1:
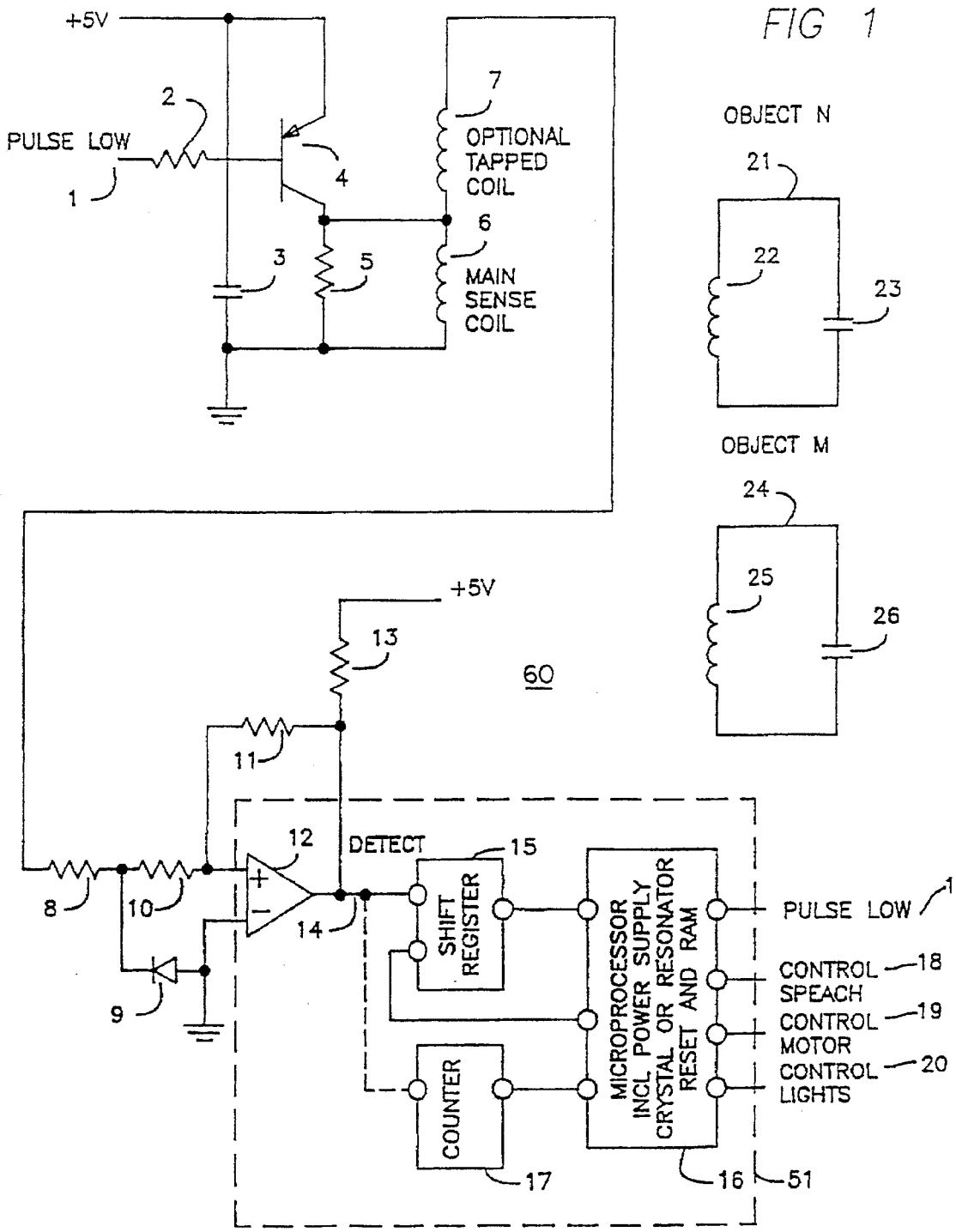
FIG. 1 is a schematic drawing of the basic sensing arrangement or base unit used in the invention.

The basic structure of the object recognition system comprises a base unit 60 and one or more responders 21, 24. The responders 21, 24 are generally simple and inexpensive and can be located inside of products or toys 50 that need to be identified. It is possible, however, for a responder 21, 24 to be more complex-this is an active responder-because it will combine the function of a simple responder with additional circuitry that may add play value to the toy or product 50.

The base unit 60 contains the software for the functioning of the system. The responders 21, 24 are sensed by the base unit 60, and the software makes decisions as to what should happen next. For example, if the base unit 60 determines that object A (which could be a doll) is located next to object B (which could be a toy spider), it could emit a screaming sound which would appear to come from the doll. In this way, by putting all the complexity in the base unit 60, an exciting and complex play pattern can be offered without the objects 50 having much complexity or intelligence or more importantly, cost.

The base unit 60 may, as indicated, include speech capability, motors, lights, or whatever is desired for the toy or product. As shown in FIG. 1, the output of the microprocessor 16 controls speech 18, motion 19 and lights 20. What makes it unique, however, is its ability to negotiate interactivity between external sensed objects. While the electronics in one preferred embodiment are geared to toys 50, the same technology can be used for more serious products, such as a wireless computer mouse (not shown). In the case of the mouse, the base unit 60 would be the mouse pad, connected to an electronics package, and the mouse itself would consist of a responder or responders, as described below.

FIG. 1 shows the block diagram for the base unit 60, and also shows two responders 21 and 24. Referring now to FIG. 1 of the drawings, the object recognition system of the present invention comprises passive responders 21 and 24 which are placed within objects such as toys 50. The base interrogation unit 60 sends a pulse 99, see FIG. 2, and the passive responders 21 and 24 reply with their unique frequency which is sensed by unit 60. The pulse 99 is formed by switching transistor 4 into the conducting state, biased through resistor 2 and controlled by signal 1. As the transceiver sensing loop 6, 7 is thus energized, current begins to rise slowly due to the inductance of loop 6 and/or 7. When the current reaches a predetermined value based on combination of the maximum current rating of the transistor 4 and the desired output level, the transistor 4 is switched off, producing a flyback pulse in coil 6/7 caused by the collapsing magnetic field.

Also as a result of the flyback pulse, and because of the self capacitance of the loop 6/7, an oscillation will begin in the loop 6/7. This is damped quickly by resistor 5. Although a PNP transistor 4 is used, any suitable bipolar or field effect transistor may be used as transistor 4. Each interrogation pulse 99 and follow on activity is known as a SCAN period.

The scan pulse 99 may draw as much as 0.5 ampere or more, but because the energizing pulse is on the order of 100 microseconds, and the scan rate is on the order of 10 milliseconds, the average power is reduced by 100 to 5 milliamperes. Capacitor 3 will serve to average out the power.

The power can be further reduced through intelligent scanning. This is an important innovation of the present invention since it makes the technology applicable to battery operated equipment. For example, the nominal scan rate can be set at 100 milliseconds, reducing the power again by a factor of 10 to 0.5 milliamperes. Then, if any object 50 is detected at all, the scan rate can be dynamically increased for more accurate detection.

Microprocessor 16 contains the control, sensing, decoding and other algorithms such as speech. The control algorithm is that portion of the program which decides when to issue an interrogation pulse. For extreme power savings, the microprocessor 16 can enter sleep mode and use a timer to wake up at selected intervals, for example one second, and send out an interrogation pulse 99. Additionally, the power consumed can be adjusted downward by reducing the ON time of transistor 4. This will produce a weaker pulse, but if anything is detected, power can be increased dynamically for more accurate decoding. With this method, power can be reduced to typically 25 microamperes, which is within the shelf life drain level for batteries. This feature allows a passive responder 21, 24 to effectively "turn on" a battery operated system. Prior systems that scan continuously cannot offer this feature, which limits their practical usage.

The coils 22 and 25 in LC circuits 21 and 24 respectively may be either air core (this includes magnetically inert materials), ferrite core, or any other magnetic material with low losses. It is important for the inductors 22, 25 to have as high Q as possible. For example, in the preferred embodiment inductor 22 was wound with #30 wire, which has less resistive loss than a higher gauge, and hence, a higher Q. A higher Q will translate into a larger received signal and more complete cycles received. Ferrite is preferred as a core material when smaller size is needed, such as when the LC circuit 21, 24 is placed in a die cast miniature toy car (not shown). In the case of the die cast car, some detuning of the LC will result as it is installed in the car, but this can be compensated for in the manufacturing process. Capacitor 23 (and 26 also) is of any type that holds a good enough tolerance to allow the system to discriminate the number of different passive objects required. This will include temperature, aging, and manufacturing variations, and the capacitor 23 should not exhibit any losses that will reduce the Q significantly.

Flyback pulse 100, see FIG. 2, is coupled to the objects 50 containing a pickup loop or LC resonating circuit. The LC circuits 21, 24 will be set into oscillation by the step impulse, and they will radiate at their characteristic frequency.

The passive responder radiation will in turn be induced into the main sensing loop 6/7, and comparator 12 in turn will square this up as the wave makes zero crossings. An amplifier may be inserted before the comparator 12, but the signal to noise ratio was not necessarily improved by this modification, so that the comparator 12 alone will usually suffice. Hysteresis is provided on the comparator 12 to prevent it from oscillating, using resistors 10 and 11. The value of positive feedback resistor 11 and series resistor 10 will also set the threshold level at which a signal can be received, so low level noise is rejected. Resistor 8 is used to limit the current into the comparator circuit, and diode 9 bypasses the flyback pulse 100 away from comparator 12. The comparator circuit also uses pull up resistor 13. Alternatively, an amplifier of sufficient gain may be used in place of the comparator, since it can provide essentially the same function.

After a number of cycles of oscillation of the passive responder 102, see FIG. 2, damping will occur to the point where the oscillation can no longer be picked up by the main sensing loop 6. The time between the trigger pulse and the quenching of the oscillation is known as the detection period.

During the detection period, microprocessor 16 is dedicated to receiving the DETECT signal 1. In the preferred embodiment, DETECT is fed into the serial input of 8 bit shift register 15. Then, every 8 shift register clocks, the microprocessor 16 reads the shift register value into successive RAM locations. What is then left in the RAM is a history of the input signal, similar to the way in which a logic analyzer stores up a signal. RAM is usually self contained in the microprocessor IC 30 to reduce costs. At the end of the DETECT period, microprocessor 16 will begin to interpret the data in its RAM.

An alternative embodiment, which cannot discriminate frequencies as well as the preferred embodiment, but which may be used if microprocessor 16 does not have a shift register 15 integrated onto it, and the manufacturer desires to save as much costs as possible, and if the microprocessor 16 does have a counter 17 integrated onto it, is to feed the DETECT signal into counter 17. Before or immediately after the interrogation pulse 99, the microprocessor 16 will reset the counter 17. Then, the microprocessor 16 can measure the time it takes for the counter 17 to reach a certain value, such as 4 or, alternatively, the microprocessor 16 can try to measure the period of the DETECT signal, although this will be difficult with today's IC's due to speed limitations. Unfortunately, it is not sufficient or advisable to gate the counter's input for a specific time and read its count, because the resolution of frequency discrimination would be reduced. This is due to the fact that only a limited number of cycles will be received from the passive responder 21 or 24.

If counter 17 is used, a numerical value will be obtained, which will be compared with allowable known values that have been previously assigned to different responders 21, 24 included in the system. If there is a match, then microprocessor 16 will perform a majority logic decision, which may include a total majority, on successive scans. This will help eliminate false triggering, and at the same time will ensure that the responder 21, 24 is in the area of the main sensing loop long enough to be taken seriously. For example, if scans are performed every 10 milliseconds, then certainly 4 to 10 of them can be examined without noticeable delay. This is known as debouncing. The same principle is used if a shift register is employed.

If shift register 15 is used on the software equivalent, as in the preferred embodiment, then after the detection period, the microprocessor 16 will perform an algorithm to determine what, if anything, was received. The simplest method of decoding is to measure 1 and 0 run lengths and look for a pattern that would indicate a steady frequency coming in. This is most easily accomplished in a multiple step process although the exact steps may vary. Typically the first one or two transitions will be discarded, owing to the settling time of the self oscillation of the scan loop 101. If irregular periods are found in the data, then this is interpreted as the interference pattern of multiple responders in the same area. The simplest approach is to simply to lock this situation out, as most play scenarios for the toy usages or mouse usage call for only one responder in the area at a time. Note that systems using a counter 17 would not be able to read two frequencies at once.

If it is desired to decode both frequencies, there is a choice of algorithms in which the task is to look for periodicity at certain frequencies that are included in the library of allowable frequencies, as set by the manufacturer initially. Because much time is available in between scan pulses, a simple interactive algorithm is used, looking at beat frequencies as well as instantaneous frequencies, to converge on the correct answer. Other forms of digital filtering are possible. If the algorithm cannot converge, then it assumed that other unknown objects or interference are present, and indeterminate results are reported to the main control loop portion of the software.

The results of the scan are then fed into majority logic or are integrated digitally to arrive at a valid result. The scan routine can also keep track of the number of zero crossings that are received after each scan pulse, to give an indication of the integrity or confidence factor of detection.

Figure 5A:
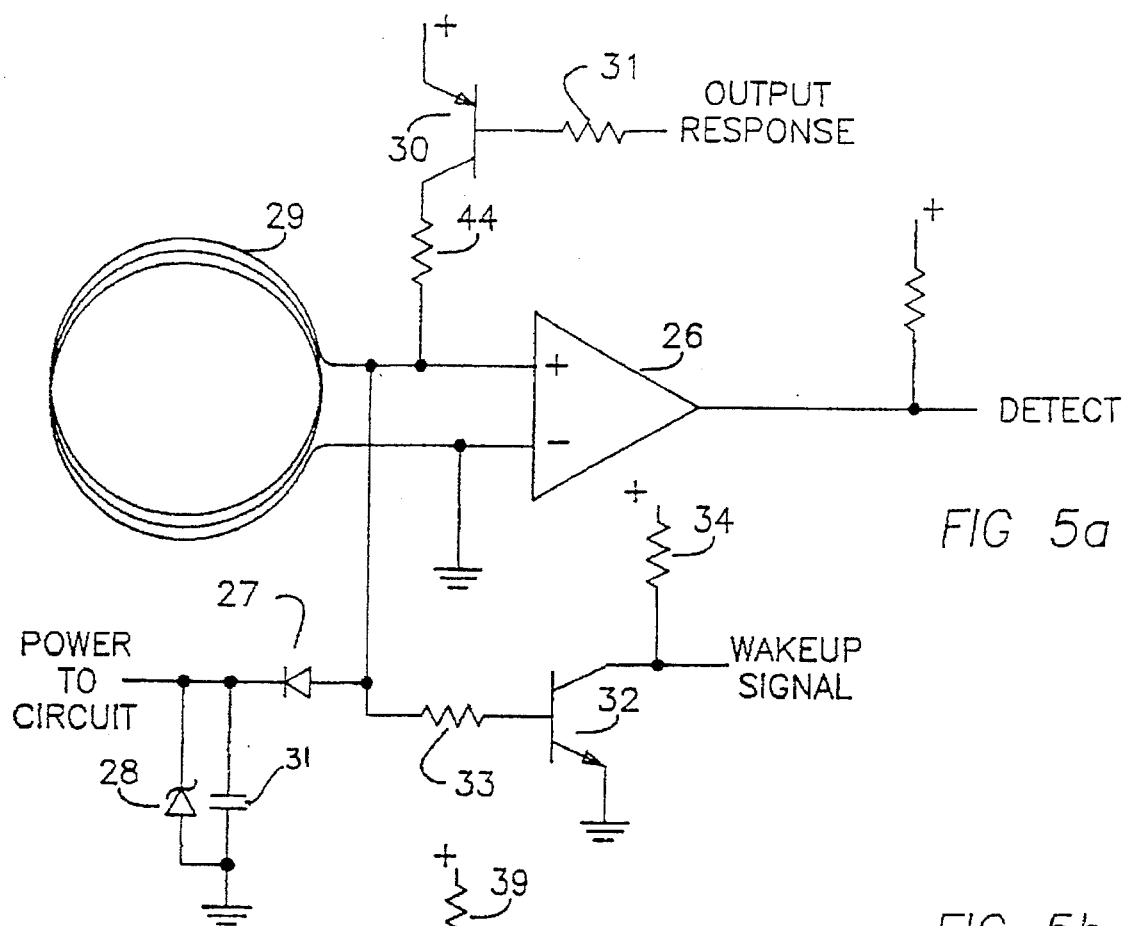
FIG. 5a–5c disclose an active, sensed or controlled object.
Figure 5B:
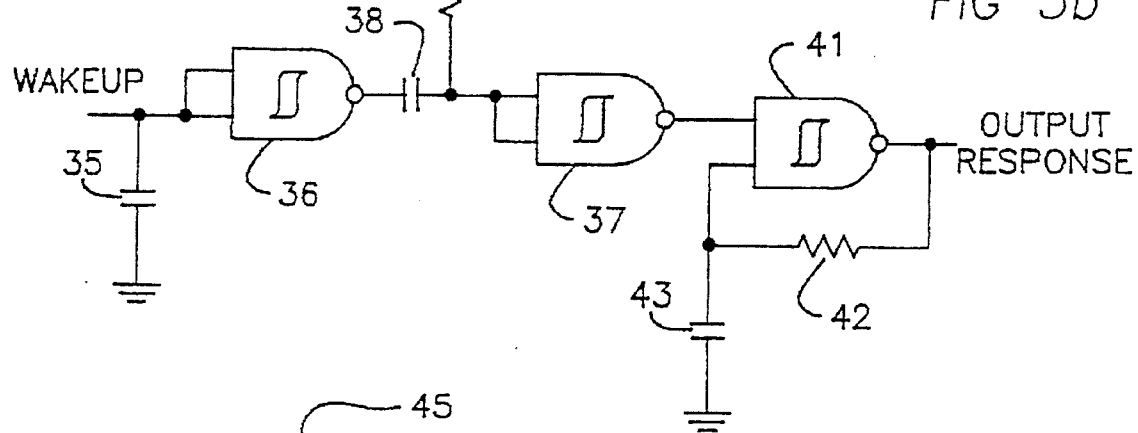
Figure 5C:
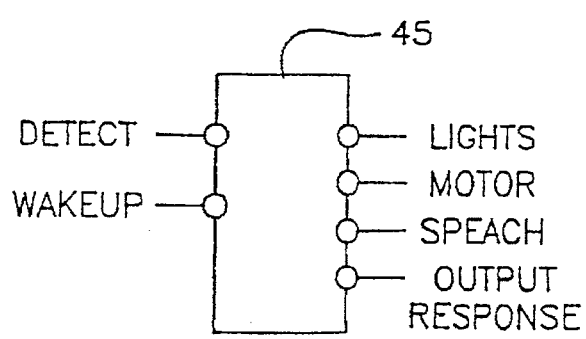

FIG. 5a–c depict active responders. In this application "active" will mean a responder that has its own battery power. Note that no standby battery power needs to be used, because a scan pulse can forward bias transistor 32 and enable power to the circuit. Comparator 26 can be used to detect subsequent scan pulses, or transistor 32 can perform that task, although at lower sensitivity. It is also possible, if the active responder electronics use extremely low power to rectify, filter, and limit the incoming scan pulse to provide power to the circuit using diodes 27 and 28 and capacitors 31.

In the case of the active responder, FIG. 5a voltage is induced in loop 29 by the scan pulse, similar to the passive case. However, in the active responder, this pulse does not cause an immediate output response. The scan pulse, in addition to optionally enabling power to the active circuit by switching on transistor 32 through its bias resistor 33, can trigger an output response such as the delayed outputting of a frequency burst 103 in timing diagram of FIG. 2. The response burst frequency is applied to transistor 30 through resistor 31. In use, a second transistor (not shown) can be coupled to transistor 32 to wake up the circuit from an opposite polarity pulse. This is advantageous if the sensed object is rotated 180°. Different active responders can be set with different time delays, so that the scan can easily determine which device is responding, and interference will not occur.

In the embodiment of FIG. 5b, a CMOS quad schmitt NAND gate is used as a timer and oscillator. In this circuit, comparator 26 is not used. Transistor 32 pulling resistor 34 low creates a signal called "wakeup" which is also applied to capacitor 35 and gate section 36. Gate 37 and resistor 39 and capacitor 38 form a one shot circuit which is used to control the input to gate 41. Gate 41 forms an oscillator, along with resistor 42 and capacitor 43. The resulting signal "Output Response" is applied to transistor 30 through resistor 31 and current limiting resistor 44. This sends a response signal back to the main sensing loop.

In another embodiment, shown in FIG. 5c, a microprocessor 45 is used to decode the scan pulse and issue an appropriate response. Note that microprocessor 45 can also perform other functions such as controlling lights, motors, and speech.

The scanner unit can also encode the scan pulses through pulse position modulation to trigger active responders in an addressable manner, or can use the same pulse position modulation to elicit specific output from the active responders-such as turning on a light or motor or speech IC. For example, in toy usage, if the child brings a toy helicopter near the base unit 63, the base unit 63 could pretend to shoot it and make the helicopter emit a sound, have its propeller fall off, etc. Note that the passive responders 21, 24 will be impervious to this modulation.

Finally, the active devices can deliver information to the scanner, such as command acknowledge and status of child-operated controls, to the scan unit by modulating the position or frequency of the response burst 103. If a large amount of information must be transmitted, for example with an encoded keyboard, then modulation can be applied to the response burst 104.

The scanning, decoding, power management, and response routines such as speech can be called by the main loop either directly or through interrupts. The power management will set the power level of the scan sense loop and also determine if the device should enter sleep mode. The main control loop will also decide which loops to scan, if multiple or matrix of scanners are included in the system. An integrity or confidence level will be tracked for each sensing loop to assist in response decisions. The confidence is related to how many clean transitions are received on the DETECT signal.

Figure 3A:
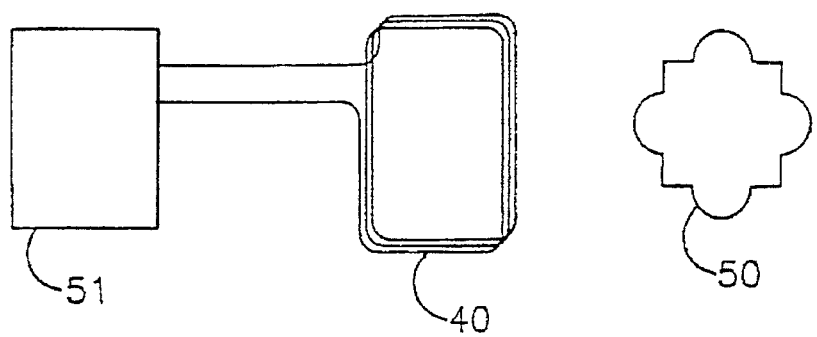
FIG. 3a–3d illustrates the invention in various preferred embodiments.

FIG. 3a shows the layout for the basic, most simple configuration of the system. The sensing loop 40 which may be circular, rectangular, or any practical shape, is connected to the circuit board 51. The circuit board 51 contains the microprocessor 16 and whatever else is included in the system-speaker, lights, motors, etc. The power supply will be battery for most usages, or an AC supply may be used to power the circuit board 51. The circuit board 51 and sensing loop 40 are both considered to be part of the base unit 63. Also shown is one sensed object 50, of which there can be many, which is the point of this invention.

Figure 4A:
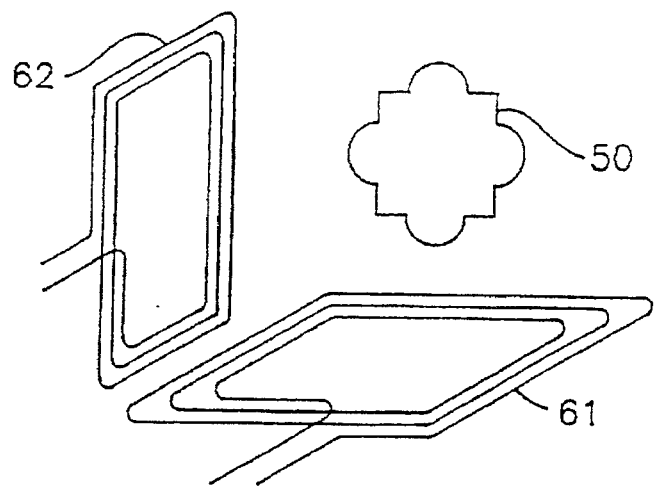
FIG. 4a and 4b respectively show orthogonal loops and responders within an object.

The sensed object's loop, unless it is extremely close to the base unit 63, must have at least a small geometric component in the same plane as the base unit loop. Therefore, a toy character 50, for example, will not be identified correctly if it is at right angles to the sensing loop 40. One way to compensate for this is to arrange the play pattern so that the objects will be held by the child according to certain natural play patterns. Another way is illustrated in FIG. 4a. In this, there are two sensing loops 61 and 62 which are labeled horizontal and vertical respectively. The two loops 61, 62 are orthogonal to each other, and both are considered part of the base unit 63 and are connected to the circuit board 51. The loops 61, 62 are activated sequentially for simplicity of operation and so that interference will not occur. The base unit's microprocessor 16 can then decide which orientation the various objects are in, which will give a better chance of detection, and can enhance play operation. If an object 50 appears in the image of both loops, then it is assumed to be at an angle between the two.

Figure 4B:
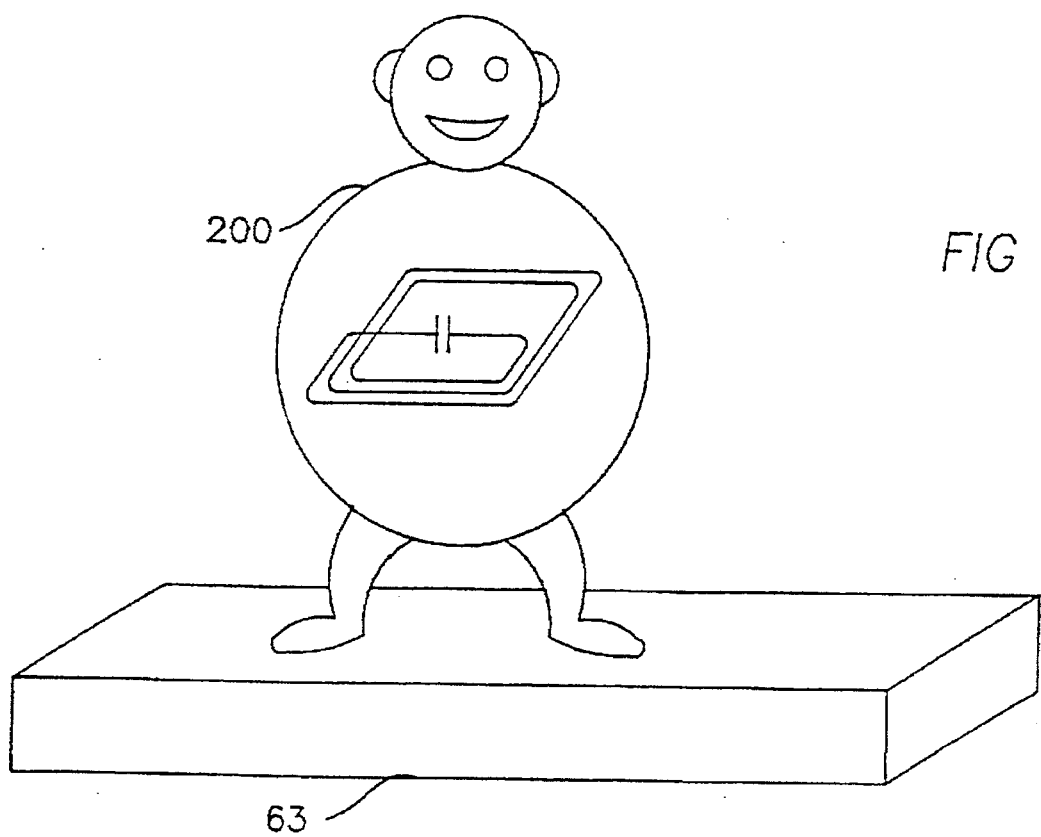

FIG. 4b is simply a detail of how a responder 21, 24 is placed in a toy action figure 200. The responder coil 22, 25 may be either in a horizontal or vertical plane, or may be at an oblique angle. It is all up to the designer to achieve the desired effect.

Figure 3B:
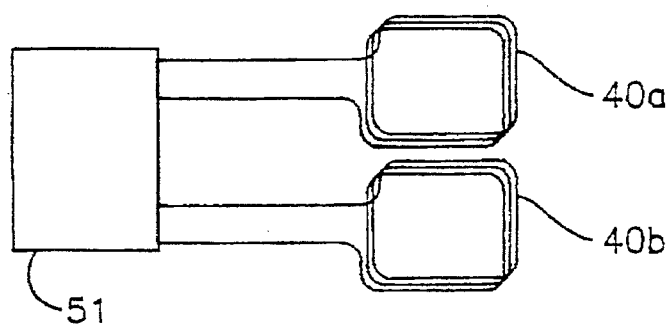

If it is desired to determine not only the presence of an object 50 but also its location, then multiple sensing loops 40a, 40b may be used. The simplest such arrangement is shown in FIG. 3b. This is electrically the same as FIG. 4a. The only difference is that now the two sensing loops 40a, 40b are placed in the same plane. As the responder object 50 is passed over the sensing area of one loop 40a to the other 40b, the microprocessor 16 will first receive the signal from the first, then both, and then the second. In this way it can track motion.

Figure 3C:
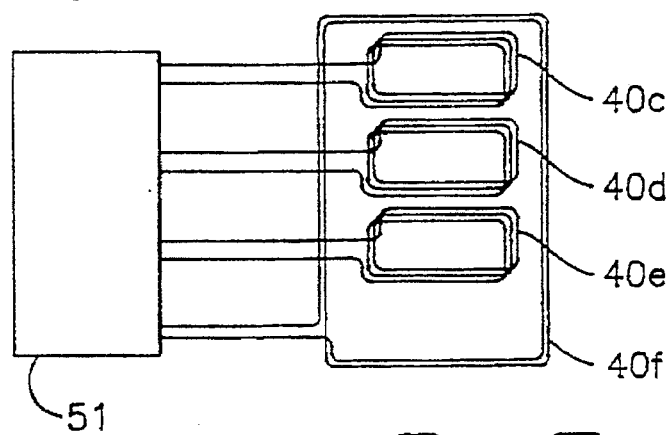

It is possible to have as many sensing loops 40 as the designer needs, limited only by cost. It will be noted that to transmit the sensing pulse a transistor is used, whereas to receive a response a comparator is used. It may be possible to save cost by separating the functions and using multiple transmit loops with one receiver loop, as in FIG. 3c, or multiple receive loops with one transmit loop 40e if that saved cost. FIG. 3c shows three transmit loops 40c, 40d, 40e working in conjunction with one receive loop 40f. The transmit loops are activated in a sequence so that they do not interfere, although the exact sequence is not important. The incoming signal will be received in the single receive loop, just the same as the basic sensing arrangement.

Figure 3D:
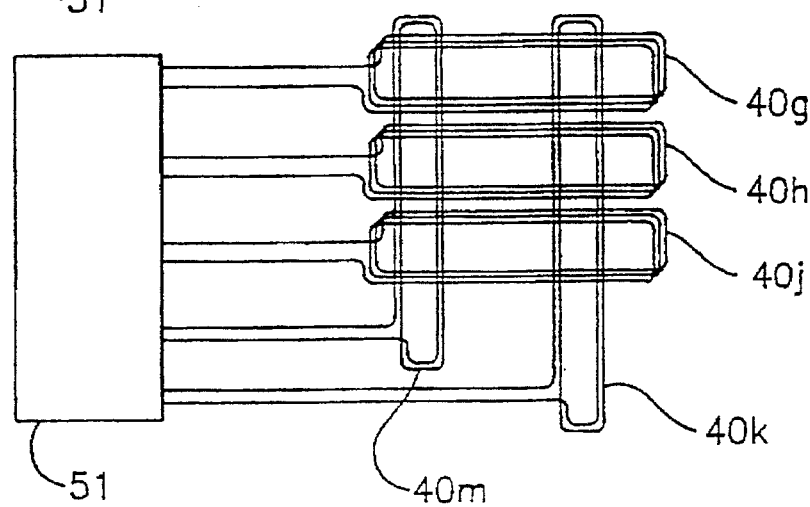

If it is desired to determine a responder's location with a high resolution, for example, if a playset had streets with houses and you wanted to know which lot the character was standing on, then a matrix of loops can be used, as in FIG. 3d. Schematically speaking, these can be considered rows and columns. The individual loops can be all standard transmit/receive loops, or they may be broken up into transmit loops and rows 40g, 40h, 40j and receive loops on columns 40k, 40m, shown in FIG. 3d.

FIG. 6a-f are schematic representations of switchable responders. FIG. 6f is the simplest. It includes inductor 70, capacitor 71, and switch 72. Switch 72 may either normally open or normally closed, depending on the designer's wishes. The unique feature that sets this apart from prior art is that this gives the responder the ability to be a remote commander to the base unit. For example, if these electronics were placed inside a plastic toy action figure which may even be dirty, the switch 72 could be located in the chest. If the child pressed the switch 72, the base unit could sense that frequency and emit a sound, for example a blast, or speech.

FIG. 6a shows a multiple frequency responder in which individual switches are used. This could be a miniature keyboard in which keys cause the base unit to play musical notes. Or, it could have a picture next to each switch or pushbutton, and the base unit would speak a sample of speech from the designated character. Coil 54 and capacitors 55, 56 and 57 are the frequency determining elements of the circuit. In the first case, individual switches 58, 59 and 63 are used to select the transponder frequency. In FIG. 6b second case, a multiple position switch 53 will make the selection.

FIG. 6c is similar to 6a except that a tapped inductor 65 provides the multiple frequency ability, and a single capacitor 66 is used. As in 6a, discrete switches 73, 74, 75 and 76 can be used, or a multiple position switch 77 can be chosen.

FIG. 6e is more complex in that two multiple position switches are used. Tapped coil 78 is connected to both switches 79 and 80 and single capacitor 81. Note that the coil taps connected to switch 79 are schematically shown to be larger than the taps connected to switch 80. If the number of turns between each coil tap connected to switch 79 exceeds the total number of coil turns between all the taps switched by switch 80, then each possible switch combination selected by switches 79 and 80 together will yield a unique frequency. The total number of frequencies will be the number of possible positions of switch 79 multiplied by the total number of possible positions of switch 80. For drawing 6e as shown, this would be 9 frequencies. Therefore, 80 will be a fine tuning control and 79 will be coarse tuning. This arrangement can be used to build a computer mouse, with switch 80 coupled to the X direction roller, and switch 79 mechanically coupled to the Y direction roller. It will be seen to those skilled in the art that this arrangement can be easily rearranged to the use switchable capacitors and a single inductor, or different numbers of frequencies.

In this specification, long term averaging and multiple frequency algorithms are mentioned. Specifically, long term averaging refers to a technique where run length values are averaged over more than one scan to arrive at a more precise measurements of run length, and hence, frequency. In any event, whether or not long term averaging is used, the final frequency is taken by the following method: "N" run lengths are added, with "n" being equal to a number deemed sufficient to ensure accurate detection, such as 4 or 8, and the resultant value is compared with a ROM table. This method of averaging does not require a division operation, because we are only interested in matching the responders with known values in ROM, and are not concerned with "frequency" per se. More than one responder is in the same area this is recognized because other than 50% duty cycle square waves appear in memory, the resultant signal received by the base unit will be the sum of sinusoids, and they can be identified using digital filtering techniques. One is helped in this process by the fact that the encoded objects always produce a sine wave, because they have high Q, and have been triggered to oscillate by the interrogation pulse.

The sum of frequency #1 of amplitude A and frequency #2 of amplitude B is: (note "w"=omega)

$Y = A\sin(w1t) + B\sin(w2t)$ or $= (A+B)\sin((w1t+w2t)/2)\cos((w1t-2t)/2)$

Using digital filter theory, one can determine how well sinusoids of different frequencies will be distinguished from each other. First of all, the shift register clock frequency must be at least twice the frequency of the sinusoids that will be received, to satisfy the Nyquist sampling requirement. Secondly, the number of total bits stored in RAM, in conjunction with the shift register clock rate, will determine how closely we can resolve different frequencies. For example, if the shift register bits are stored up for 300 microseconds, then one will theoretically be able to resolve signals with a spacing of 1/300 microseconds=3.33 kHz.

It is also known that system performance can be improved by increasing the shift register clock frequency above the minimum value. This occurs because the noise in a sampled system is present from 0 Hz to the Nyquist point, which is one half the sample clock frequency. Therefore if the shift register clock frequency is increased, which is the same as the sample clock frequency, the noise is spread out into a larger frequency band, and less of the noise will appear in the band of interest.

An additional improvement is provided by the action of dithering, which can increase the performance of an Analog to Digital converter by a fraction of a bit, provided by the noise inherent in the input amplifier. Dithering is known in the art.

The performance of the system can be improved through the use of a multiple bit width Analog to Digital Converter and shift register, but at an increase in system cost, which may diminish the practicality of the system using present day hardware.

Once the bits are in RAM, the algorithm first checks for the quality of the incoming data by determining that bit transitions are present in the entire RAM, and if so, the 1 and 0 data in RAM are converted to +1 and −1 signed numbers. These are actually represented as Hexadecimal 3F and C0 in the preferred embodiment, for example. Next, a digital band pass filter function is calculated, operating on the data in RAM. Depending on the amount of RAM available in the system, and the number of responders that must be resolved in the given system, we may calculate a Fast Fourier Transform, or a Finite or Infinite Impulse Response Bandpass Filter. A bandpass filter will take a smaller number of calculations than an FFT, but will only provide an output value for a single frequency band. Therefore, if system resources are extremely limited in terms of RAM, or if the system only uses a small number of responders, an iterative loop will calculate bandpass filters at different center frequencies until signals are found. However, in general case we calculate an FFT and compare peaks in the output of the FFT with tables of known responder values, to produce an output.

If system resources are extremely limited, one can still distinguish multiple responders to a certain extent. The greatest success will be achieved when there is the greatest spacing between the frequencies. The algorithm used is a simple examination of the bits in RAM. Again, as stated before, only the present invention with it's shift register, is capable of doing this. Prior art systems using counters to measure frequency would produce an incorrect output with multiple responders.

In this simplified algorithm, the following steps are performed. It is possible that no conclusive answer will be found, in which case the main control program is instructed to assume that multiple objects are in the same area. The control program can then wait, or issue a prompt to the user, or enter a random play pattern routine.

1. Scan through the data to look for repeating patterns of run lengths, which is often the signature of a mixture of a low and high frequency signal. If found, the data will show a short burst of high frequency at each polarity reversal of the low frequency. Measure both, compare with a ROM table, and report to the main control software.
2. If the frequencies are closer together, a beat frequency will be found in the data, and run lengths are tallied into "bins" of similar lengths, and then compared with a ROM table that may identify the groupings.
3. If the amplitude of one responder is much larger than that of the other (due to different distances or orientations), a swamping effect will occur where the smaller signal will not be seen at all. This is not a problem, because the control program can remember if a responder was recently in the sensing area, so that if it appears again in a short time, it is considered to have not left the area.

If multiple frequencies were detected but not discriminated successfully, the interactive control program of the toy or game can prompt the child to simplify the situation by prompting her to move some of the objects out of sensing range or the program can simply wait.

In a system where more than one scan loop (receive and/or transmit) the algorithm will remember which objects were sensed by which loops. This is the most practical and fool proof method of all, for detecting multiple objects. Of course, if an object is sensed by two loops, it is assumed to be physically near both loops, as some spill over will occur.

While the invention has been explained by a detailed description of certain specific embodiments, it is understood that various modifications and substitutions can be made in any of them within the scope of the appended claims which are intended also to include equivalents of such embodiments.

What is claimed is:

1. An object recognition system comprising:
    a plurality of passive responder circuits responsive to various frequencies each including an LC circuit with a coil having a plurality of taps and series connected capacitor,
    a transceiver having a loop for producing and transmitting a single interrogation pulse at repeated intervals through said transceiver loop and receiving and decoding the echoed characteristic single frequency from the passive responder circuits, said transceiver including antenna pulse providing means and echo signal receiving means, and
    wherein the presence of an object having a responder may be detected by the echoed frequency received by the transceiver from the responder only when the object is present.

2. An object recognition system in accordance with claim 1 further including:
    switch means to activate the passive responders, said means connected in each LC circuit to activate said circuit and providing means to discriminate multiple frequencies.

3. An object recognition system in accordance with claim 1 further including:
    means to change the frequency of the passive responders by changing the taps in the LC circuit coil.

4. An object recognition system in accordance with claim 1 further including:
    means to change the frequency of the passive responders by switching in different capacitors in the LC circuits.

5. An object recognition system in accordance with claim 1 further including:
    a microprocessor to control the transceiver, and
    the transceiver includes at least two receiving loops to provide an orthogonal pickup pattern wherein at least one of said loops will continue to sense the object correctly, said loops being activated one at a time.

6. An object recognition system in accordance with claim 1 wherein:
    the transceiver includes a comparator for receiving signals from the responder and a microprocessor for interpreting the received signals, said comparator providing an output signal for scanning purposes.

7. An object recognition system in accordance with claim 6 wherein:
    the microprocessor provides an output pulse and further including a counter receiving the output pulse from the microprocessor to measure the time elapsed for a predetermined number of cycles to be received.

8. An object recognition system in accordance with claim 6 further including:
    a shift register coupled to the comparator to receive the output signal therefrom wherein the microprocessor can read parallel bytes in and wherein:
    the shift register provides an output wherein a number of bytes are stored up in real time in RAM and analyzed later by the microprocessor between interrogation pulses.

9. An object recognition system in accordance with claim 8 further including:
    means wherein the bit pattern in the RAM is analyzed to reject false signals.

10. An object recognition system in accordance with claim 8 further including:

means to analyze the bit pattern in the shift register comprising a signal processing algorithm to discriminate multiple responders in the same vicinity and identify different frequencies simultaneously.

11. An object recognition system in accordance with claim 5 wherein:

the microprocessor algorithm performs a long term average of the received signal in order to reject false signals, eliminate false readings and make majority logic decisions on repetitive scans to improve sensing range, and multiple loops are included to eliminate interference and to facilitate discriminating multiple simultaneous objects by limiting the pickup area of each and reducing the likelihood that two objects are in the same area.

12. An object recognition system in accordance with claim 1 further including:

a transceiving antenna comprising a tapped coil having a plurality of taps activated by low voltage from the transmitter circuit to provide a trigger pulse to a lower tap while the entire coil transmits or receives.

13. An object recognition system in accordance with claim 6 wherein the system includes a base unit and wherein:

the microprocessor determines whether the presence or absence of signals from the responder justify continuous scanning and places the base unit into a standby mode, in which the microprocessor will wake up periodically and provide an output pulse and if no response is received will power down.

14. An object recognition system in accordance with claim 1 wherein:

the transceiver loop comprises a transmitting coil tapped so that different power levels may be used to measure the distance to the responder circuits.

15. An object recognition system in accordance with claim 6 wherein:

the microprocessor supplies an energizing pulse to the coil which when released, creates a flyback pulse in the coil which serves as an interrogation pulse, said pulse being varied in repetition period and pulse width to reduce power consumption.

16. An object recognition system in accordance with claim 15 further including:

a microprocessor having multiple power operational mode to reduce the normal power during the standby modes of operation, such that the transceiver can detect the presence of any object but that full discrimination may require normal power.

17. An object recognition system in accordance with claim 2 wherein the system includes:

a mechanical means and a switch coupled thereto to control the frequency of a responder.

18. An object recognition system in accordance with claim 1 wherein:

the pulses from the transceiver signal an object that includes its own power source drawing zero standby power, said pulse activating said object while triggering the passive responders.

19. An object recognition system in accordance with claim 1 further including:

an actively powered object wherein, the pulses from the transceiver are coded and when detected by the transceiver and found to possess the correct code, immediately activate the object.

20. An object recognition system in accordance with claim 19 wherein:

the actively powered object performs a plurality of tasks, said actively powered object responding to the transceiver pulses with a coded response indicating presence.

21. An object recognition system in accordance with claim 19 wherein:

the actively powered unit waits for the responders having a passive mode to dampen to that mode before sending a response.

22. An object recognition system in accordance with claim 6 wherein:

the comparator is replaced with a multibit A/D converter.

23. An object recognition system in accordance with claim 8 further including software and RAM wherein:

the shift register is implemented in software in the microprocessor, said microprocessor software reads in each bit, shifts said bits to bytes, and stores the bytes in RAM.

24. An object recognition system comprising:

a plurality of passive responder circuits responsive to various frequencies each including an LC circuit with a coil having a plurality of taps and series connected capacitor, a transceiver having a plurality of loops for producing and transmitting a single interrogation pulse at repeated intervals through said transceiver loops and receiving and decoding the echoed characteristic single frequency from the passive responder circuits, said transceiver including antenna pulse providing means and echo signal receiving means, and wherein the presence of an object having a responder may be detected by the echoed frequency received by the transceiver from the responder and said system further including;

a microprocessor to control the transceiver;

the transceiver includes at least two receiving loops to provide an orthogonal pickup pattern wherein at least one of said loops will continue to sense the object correctly, said loops being activated one at a time.

25. An object recognition system in accordance with claim 24 further including:

a plurality of transmitting loop antennae and a single large receiving antenna to provide location recognition in addition to object recognition wherein only one of said transmitting antennae is active at a time controlled by the microprocessor.

26. An object recognition system in accordance with claim 24 wherein:

the plurality of transmitting antennae are positioned in a matrix of rows and a plurality of receiving antennae in columns.

27. An object recognition system in accordance with claim 25 further including:

a battery operated power supply; and, passive responder means to turn on said system.1

* * * * *